(12) United States Patent
Vansteenkiste et al.

(10) Patent No.: US 11,531,493 B2
(45) Date of Patent: Dec. 20, 2022

(54) REQUEST THROTTLING IN DISTRIBUTED STORAGE SYSTEMS

(71) Applicant: Western Digital Technologies, Inc., San Jose, CA (US)

(72) Inventors: Arne Vansteenkiste, Gentbrugge (BE); Sander De Dycker, Ghent (BE); Wim De Wispelaere, Ghent (BE); Joris Walraevens, Zottegem (BE); Dieter Fiems, Ghent (BE); Willem Mélange, Harelbeke (BE); Apoorv Saxena, Bareilly (IN)

(73) Assignee: Western Digital Technologies, Inc., San Jose, CA (US)

( * ) Notice: Subject to any disclaimer, the term of this patent is extended or adjusted under 35 U.S.C. 154(b) by 300 days.

(21) Appl. No.: 16/721,862

(22) Filed: Dec. 19, 2019

(65) Prior Publication Data

US 2021/0191650 A1 Jun. 24, 2021

(51) Int. Cl.
*G06F 13/14* (2006.01)
*G06F 3/06* (2006.01)
*H04L 47/215* (2022.01)
*H04L 67/1001* (2022.01)

(52) U.S. Cl.
CPC ............ *G06F 3/0659* (2013.01); *G06F 3/067* (2013.01); *G06F 3/0613* (2013.01); *G06F 3/0653* (2013.01); *H04L 47/215* (2013.01); *H04L 67/1001* (2022.05)

(58) Field of Classification Search
CPC ........... H04L 47/20–24; H04L 43/0888; H04L 45/24; H04L 45/302; H04L 45/306; H04L 45/3065; H04L 45/308; H04L 47/215; H04L 47/2408; H04L 47/2425; H04L 47/2433; H04L 47/52; H04L 47/521; H04L 47/522; H04L 47/527; H04L 47/6215; H04L 47/6275; H04L 47/6295; H04L 67/1002; G06F 3/0613; G06F 3/0653; G06F 3/0659; G06F 3/067; G06F 13/1615; G06F 13/1642; G06F 13/18
USPC ........ 370/395.41, 395.42, 395.43; 710/6, 20, 710/21, 74; 711/150, 151, 158; 718/103
See application file for complete search history.

(56) References Cited

U.S. PATENT DOCUMENTS

| | | |
|---|---|---|
| 8,682,955 B1 | 3/2014 | Monden et al. |
| 10,048,874 B1 | 8/2018 | Shveidel et al. |
| 2007/0118653 A1 | 5/2007 | Bindal |
| 2011/0199899 A1* | 8/2011 | Lemaire .............. H04L 47/2416 370/230.1 |

(Continued)

OTHER PUBLICATIONS

International Search Report and Written Opinion of Application No. PCT/US2020/025293, dated Sep. 11, 2020 (10 pages).

*Primary Examiner* — Ilwoo Park
(74) *Attorney, Agent, or Firm* — Patent Law Works LLP

(57) ABSTRACT

The disclosed technology includes an example system that has a request throttling manager that is configured to receive a first file data request, queue the first file data request in a first request queue, and process the first file data request based on the first token bucket. The first token bucket includes a sufficient first quantity of first tokens to process the first file data request. The system further includes a storage manager configured to access one or more storage nodes of a plurality of storage nodes of a distributed storage system in response to the first file data request.

20 Claims, 7 Drawing Sheets

(56) References Cited

U.S. PATENT DOCUMENTS

| | | | |
|---|---|---|---|
| 2012/0278530 A1* | 11/2012 | Ebsen | G06F 13/1673 |
| | | | 711/103 |
| 2013/0031239 A1 | 1/2013 | Umanesan | |
| 2015/0049764 A1 | 2/2015 | Hieda | |
| 2015/0263978 A1* | 9/2015 | Olson | G06F 3/067 |
| | | | 709/226 |
| 2017/0324813 A1* | 11/2017 | Jain | G06F 9/5016 |
| 2019/0205039 A1 | 7/2019 | Vervaet et al. | |
| 2019/0250848 A1 | 8/2019 | Benisty | |
| 2019/0324812 A1 | 10/2019 | Kusters et al. | |

\* cited by examiner

REQUEST THROTTLING IN DISTRIBUTED STORAGE SYSTEMS

TECHNICAL FIELD

The present disclosure generally relates to data storage, and in a more particular non-limiting example, to throttling distributed data storage systems.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier. This can generally allow object storage systems to surpass the maximum limits for storage capacity of file systems in a flexible way such that, for example, storage capacity is added or removed as a function of the applications, systems, and/or enterprise needs, while reducing degradation in performance as the system grows. As a result, object storage systems are often selected for large-scale storage systems.

These large-scale storage systems may need to interface with a variety of systems, platforms, and applications, some of which may exhibit different data rates, bursty data, and different classes of data that expect various levels of priority. As such, such interfacing systems may have expectations of a certain quality of service (QoS), which may present challenges for incoming requests. Further, various systems and applications may expect priority service based on the importance of the data request or subscribed premium services. Various classes of requests expecting varied priorities may present challenges in a distributed storage system.

While a QoS for incoming requests may be provided by increasing resources for the timely servicing of the requests, additional resources are generally expensive and may increase failure opportunities in the system. Further, increasing the quantity of resources may result in the underutilization of the available resources. Accordingly, without knowledge of the existing utilization of resources, a measured increase of resources is, at most, an educated guess for augmenting a data storage system architecture.

Therefore, as large-scale data storage systems become utilized by increasingly diverse and varied clients and applications, systems capable of throttling data requests may be needed in order to support advertised Quality of Services. A need exists for throttling data requests provided to existing resources in a distributed storage system.

SUMMARY

The present disclosure describes, among other things, various aspects for throttling data requests for distributed storage systems.

One general aspect includes a system having a request throttling manager, which may include and/or be coupled to a first token bucket. The request throttling manager may be configured to receive a first file data request and queue the first file data request in a first request queue. The request manager may process the first file data request based on the first token bucket, which may include a sufficient first quantity of first tokens to process the first file data request. The system may further have a storage manager configured to access storage nodes of a distributed storage system in response to the first file data request.

Implementations may include one or more of the following features. The system where the first file data request includes a first class identifying a first priority of the first file data request. The system where the request manager is configured to: receive a second file data request; queue the second file data request in a second request queue; and process the second file data request based on a second token bucket including a sufficient second quantity of second tokens to process the second file data request. The storage manager may further be configured to access one or more storage nodes of a plurality of storage nodes of the distributed storage system in response to the second file data request. In the system, the first request queue and the first token bucket operate independently of the second request queue and the second token bucket, the first and second token buckets are configured with respective first and second token bucket capacities, and the token bucket capacities define a maximum number of tokens that may be stored in the respective first and second token buckets.

The system may further include a token manager configured to monitor a token level of the first token bucket; receive a replenishment set of tokens; determine, based on the token level, that at least a portion of the tokens of the replenishment set of tokens exceeds the first token bucket capacity; and distribute the at least the portion of the tokens of the replenishment set of tokens to the second token bucket. For example, when the first quantity of first tokens in the first token bucket exceeds the first token bucket capacity by a first difference of the first tokens, the first difference of the first tokens is then distributed as a first overflow of first tokens to the second token bucket. In the system, the first token bucket may be configured with a first token bucket capacity, and the first token bucket capacity may define a maximum number of tokens that may be stored in the first token bucket. The system may further have a backend throughput manager configured to vary the first token bucket capacity based on a throughput of the distributed storage system. In the system, the first request queue may be configured as a first-in first-out (FIFO) queue or a priority queue, and the first file data request may further include a class identifier that identifies a handling priority of the first file data request in the first request queue.

In the system, the throughput may be defined by a throughput parameter that is independent of sizes of object requests received by/made to the distributed storage system. The backend throughput manager of the system may be further configured to determine the throughput parameter by at least retrieving the throughput of each storage node of a set of storage nodes (of the plurality of storage nodes) in the distributed storage system; retrieve a utilization rate of each storage node of the set; for each of the storage node of the set in the distributed storage system, generate an estimated preferred throughput per storage node by dividing the throughput by the utilization rate; sum throughputs of each of the storage nodes of the set into a backend throughput; adjust the backend throughput with a factor to account for specific storage and retrieval methods used by the distributed storage system; and adjust the backend throughput based on a desired load factor of the distributed storage system. The utilization rate may be defined as one minus idle time of each storage node in the distributed storage system.

One general aspect includes a computer-implemented method, including: receiving a first file data request; queueing the first file data request in a first request queue; and processing the first file data request in response to a first token bucket which includes a sufficient first quantity of first tokens to process the first file data request as a first object data request in a distributed storage system.

Implementations may include one or more of the following features: that the first file data request includes a first class identifying a first priority of the first file data request; receiving a second file data request; queueing the second file data request in a second request queue; processing the second file data request in response to a second token bucket including a sufficient second quantity of second tokens to process the second file data request; that the first token bucket and the second token bucket are respectively configured with a first token bucket capacity and a second token bucket capacity; that the first token bucket capacity defines a maximum number of tokens that may be stored in the first token bucket; that the second token bucket capacity defines a maximum number of tokens that may be stored in the second token bucket; that when the first quantity of first tokens in the first token bucket exceeds the first token bucket capacity by a first difference of the first tokens, the first difference of the first tokens is then distributed as a first overflow of first tokens to the second token bucket; that the first token bucket is configured with a first token bucket capacity; that the first token bucket capacity defines a maximum number of tokens that may be stored in the first token bucket; varying the first token bucket capacity based on a throughput of the distributed storage system; that the throughput being defined by a throughput parameter that is independent of sizes of object requests made to/received by the storage nodes of the distributed storage system; determining the throughput parameter by retrieving the throughput of each storage node of a set of nodes in the distributed storage system; retrieving a utilization rate of each storage node of the set; for each of the storage nodes of the set in the distributed storage system, generating an estimated preferred throughput per storage node by dividing the throughput by the utilization rate; summing throughputs of each of the storage nodes of the set into a backend throughput; adjusting the backend throughput with a factor to account for specific storage and retrieval methods used by the distributed storage system; adjusting the backend throughput based on a desired load factor of the distributed storage system; and that the utilization rate is defined as one minus idle time of each storage node in the distributed storage system.

One general aspect includes a system having means for receiving a first file data request; means for queueing the first file data request in a first request queue; and means for processing the first file data request in response to a first token bucket including a sufficient first quantity of first tokens to process the first file data request as a first object data request in a distributed storage system. The system may further include means for receiving a second file data request; means for queueing the second file data request in a second request queue; and means for processing the second file data request in response to a second token bucket including a sufficient second quantity of second tokens to process the second file data request. The first and second token buckets may be configured with respective first and second token bucket capacities, and the token bucket capacities may define a maximum number of tokens that may be stored in the respective first and second token buckets.

The various embodiments advantageously improve the functionality distributed storage networks and/or systems. For example, the various embodiments include operations to overcome or at least reduce the QoS issues in the previous storage networks and/or systems discussed above and, accordingly, are more reliable and/or efficient than other computing networks. That is, the various embodiments disclosed herein include hardware and/or software with functionality to improve the throttling of data storage requests received through one or more file interface systems for a distributed storage system. Accordingly, the embodiments disclosed herein provide various improvements to storage networks and/or storage systems.

It should be understood that the language used in the present disclosure has been principally selected for readability and instructional purposes, and not to limit the scope of the subject matter disclosed herein.

DETAILED DESCRIPTION

Figure 1:
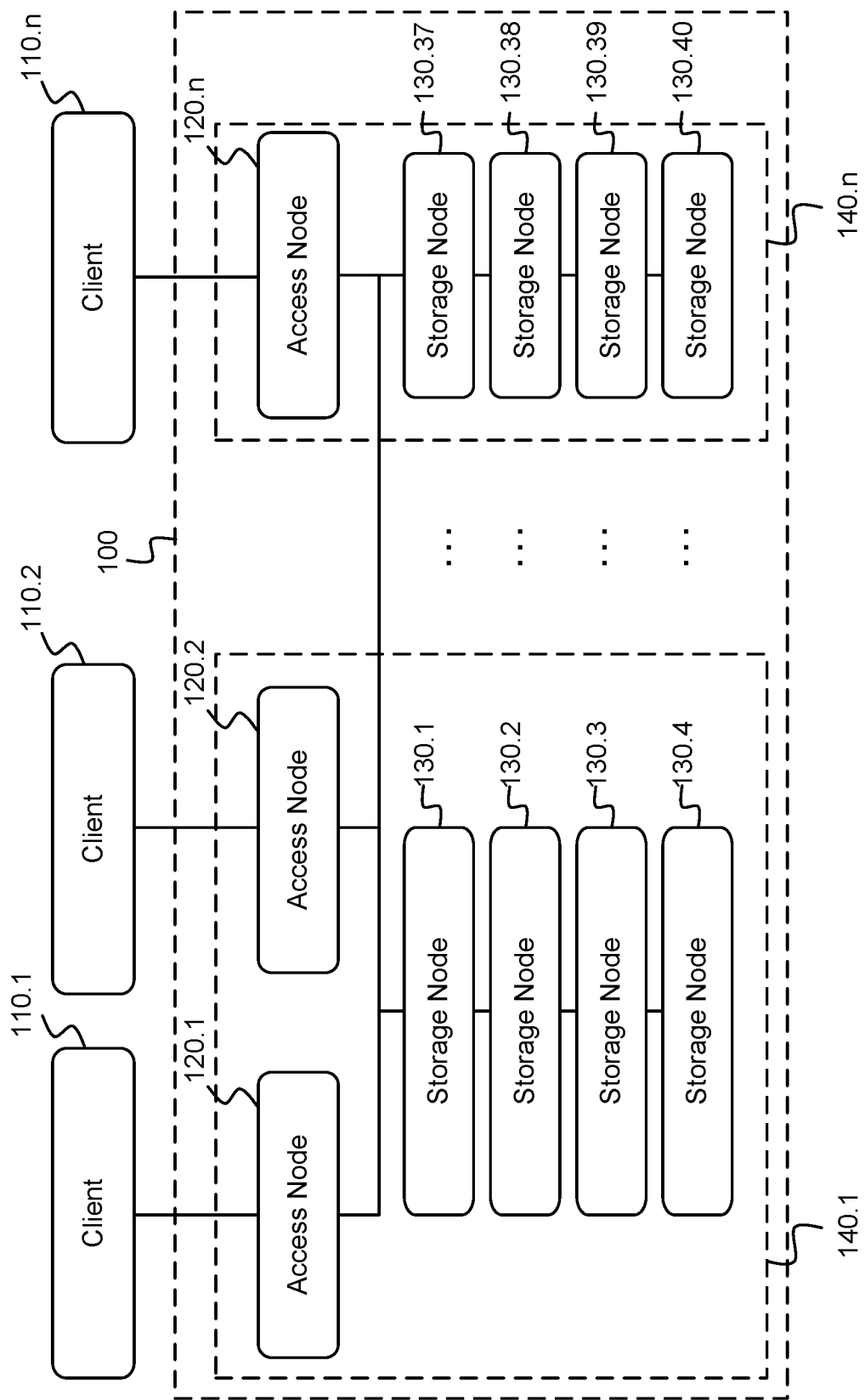
FIG. 1 schematically illustrates an example of a distributed storage system.

FIG. 1 shows an embodiment of an example distributed storage system 100. According to this embodiment the distributed storage system 100 may be implemented as a distributed object storage system which is coupled to one or more clients 110.1-110.*n* for accessing data objects. The connection between the distributed storage system 100 and clients 110 could, for example, be implemented as a suitable data communication network. Clients 110 may host or interface with one or more applications that use data stored in distributed storage system 100. Such an application could, for example, be a dedicated software application running on a client computing device, such as a personal computer, a laptop, a wireless telephone, a personal digital assistant, or any other type of communication device that is able to interface directly with the distributed storage system 100. However, according to alternative embodiments, the applications could, for example, comprise a suitable file system which enables a general-purpose software application to interface with the distributed storage system 100, an application programming interface (API) library for the distributed storage system 100, etc.

Clients 110 may include computing devices and/or systems running applications compatible with one or more file systems that manage data and data access through files, directories, volumes, devices, and/or similar logical structures for mapping data units to physical storage locations. For example, clients 110 may include file system clients configured with a file system protocol, such as network file system (NFS) protocols, sever message block (SMB) protocols, file allocation table (FAT) protocols, Hadoop™ distributed file system (HDFS) protocols, Google™ file system (GFS) protocols, etc.

As further shown in FIG. 1, the distributed storage system 100 comprises a plurality of access node 120.1-120.*n* and a plurality of storage nodes 130.1-130.40 which may be coupled in a suitable way for transferring data, for example by means of a data communication network such as a local area network (LAN), a wide area network (WAN), a telephone network, such as the public switched telephone network (PSTN), an intranet, the internet, or any other suitable communication network or combination of communication networks. Access nodes 120, storage nodes 130 and the computing devices comprising clients 110 may connect to the data communication network by means of suitable wired, wireless, optical, etc. network connections or any suitable combination of such network connections. Although the embodiment of FIG. 1 shows only three access nodes 120 and forty storage nodes 130, according to alternative embodiments the distributed storage system 100 could comprise any other suitable number of storage nodes 130 and, for example, two, three or more access nodes 120 coupled to these storage nodes 130.

These access nodes 120 and storage nodes 130 may be built as general-purpose computers, however more frequently they are physically adapted for arrangement in large data centers, where they are arranged in modular racks 140.1-140.*n* comprising standard dimensions. Exemplary access nodes 120 and storage nodes 130 may be dimensioned to take up a single unit of such racks 140, which is generally referred to as 1U. Such an exemplary storage node may use a low-power processor and may be equipped with ten or twelve high capacity serial advanced technology attachment (SATA) disk drives and is connectable to the network over redundant Ethernet network interfaces, and an exemplary access node 120 may comprise high-performance servers and provide network access to clients 110 over multiple high bandwidth Ethernet network interfaces, although any other suitable configuration and/or architecture may be used. Data is transferred between clients 110 and such access nodes 120 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 130. In some embodiments, HTTP/REST protocols complying with the Amazon Simple Storage Service (S3) object storage service may enable data transfer through a REST application protocol interfaces (API). Such access nodes 120 may operate as a highly available cluster of controller nodes with one or more integrated and/or independent interface systems, and provide for example shared access to the storage nodes 130, metadata caching, protection of metadata, etc.

As shown in FIG. 1 several storage nodes 130 are grouped together, for example because they are housed in a single rack 140. For example, storage nodes 130.1-130.4 and 130.7-130.40 each are respectively grouped into racks 140.1 and 140.*n*. Access nodes 120 may be located in the same or different racks as the storage nodes to which the access nodes connect. A rack may have multiple access nodes, for example rack 140.1, a single access node as rack 140.*n*, or no access nodes (not shown) and rely on an access node in another rack or storage nodes or clients with built-in access node and/or controller node capabilities. These racks are not required to be located at the same location, they are often geographically dispersed across different data centers, such as for example rack 140.1-140.3 may be located at a data center in Europe, 140.4-140.7 at a data center in the USA and 140.8-140.10 at a data center in China.

Figure 2:
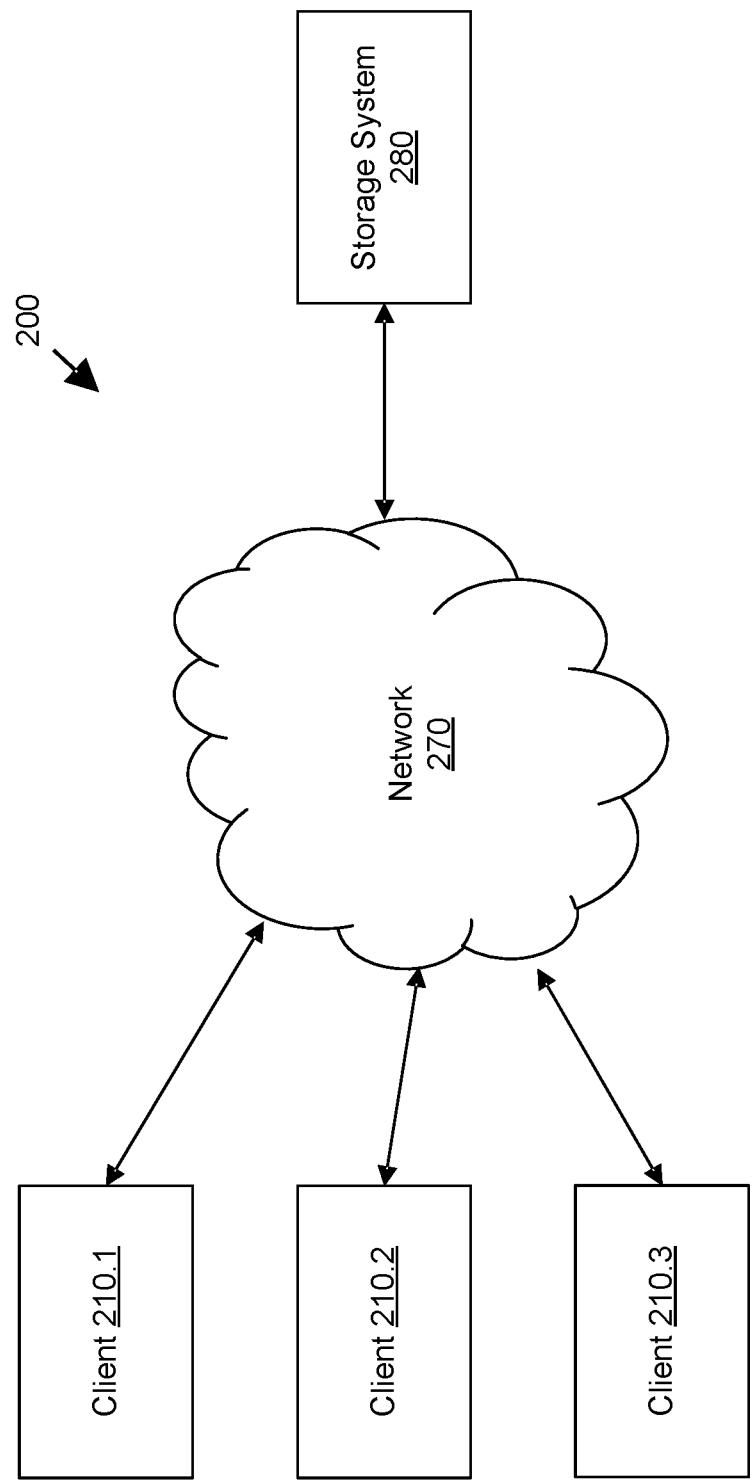
FIG. 2 schematically illustrates an example client architecture in which the distributed storage system of FIG. 1 may operate.

FIG. 2 is a block diagram of an example storage network 200 using a client architecture. In some embodiments, distributed storage system 100 may be embodied in such a storage network 200. As shown, storage network 200 can include multiple client devices 210 capable of being coupled to and in communication with a storage network 200 via a wired and/or wireless network 270 (e.g., public and/or private computer networks in any number and/or configuration (e.g., the Internet, an intranet, a cloud network, etc.)), among other examples that may include one client device 210.1 or two or more client devices 210 (e.g., is not limited to three client devices 210.1-210.3).

A client device 210 is any computing hardware and/or software (e.g., a thick client, a thin client, or hybrid thereof) capable of accessing storage system 280 utilizing network 270. Each client device 210, as part of its respective operation, relies on sending input/output (I/O) requests to storage system 280 to write data, read data, and/or modify data. Specifically, each client device 210 can transmit I/O requests to read, write, store, communicate, propagate, and/or transport instructions, data, computer programs, software, code, routines, etc., to storage system 280. Client device(s) 210 and storage system 280 may comprise at least a portion of a client-server model. In general, storage system 280 is accessed by client device(s) 210 and/or communication with storage system 280 is initiated by client device(s) 210 through a network socket (not shown) utilizing one or more inter-process networking techniques. In some embodiments, client devices 210 may access one or more applications to use or manage a distributed storage system, such as distributed storage system 100 in FIG. 1.

Figure 3:
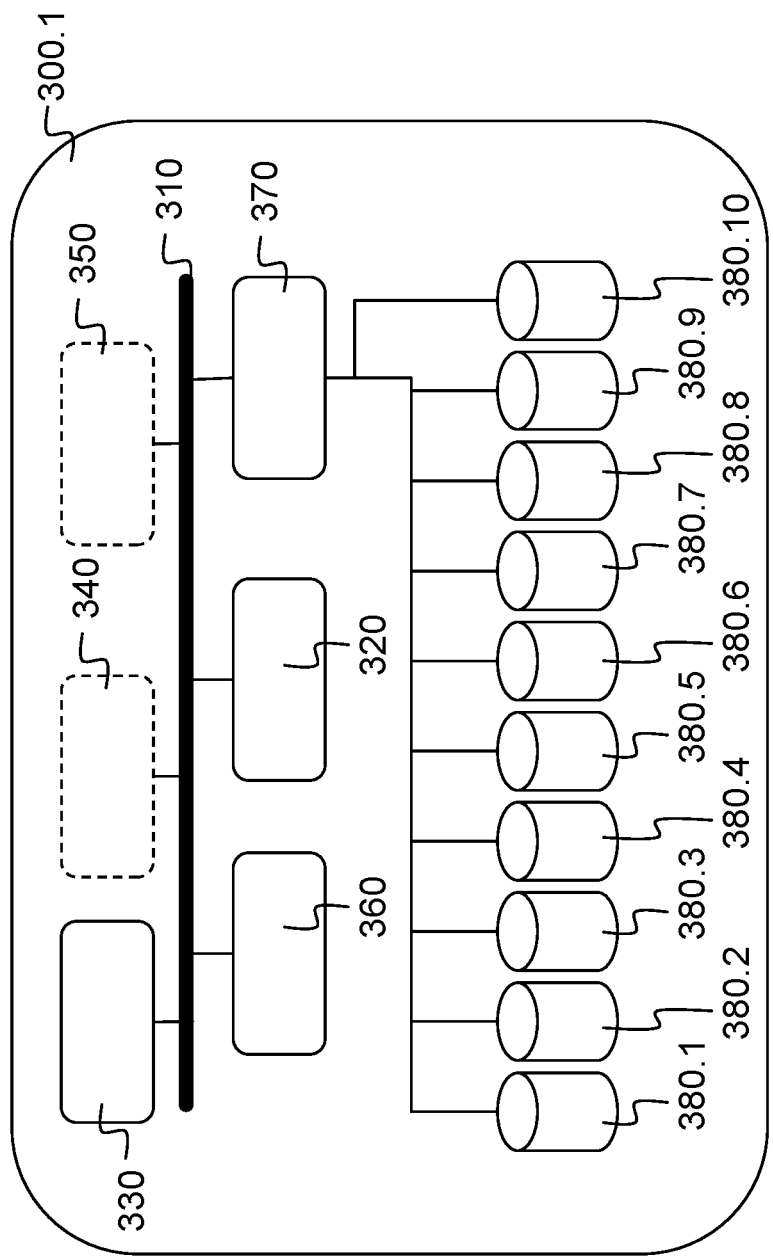
FIG. 3 schematically illustrates an example of a storage node of the distributed storage system of FIG. 1.

FIG. 3 shows a schematic representation of an embodiment of one of the storage nodes 300. Storage node 300.1 may comprise a bus 310, a processor 320, a local memory 330, one or more optional input units 340, one or more optional output units 350, a communication interface 360, a storage element interface 370, and two or more storage elements 380.1-380.10. Bus 310 may include one or more conductors that permit communication among the components of storage node 300.1. Processor 320 may include any type of suitable processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more suitable mechanisms that permit an operator to input information to the storage node 300.1, such as a keyboard, a mouse, a pen, voice recognition and/or biometric mechanisms, etc. Output unit 350 may include one or more suitable mechanisms that output information to the operator, such as a display, a printer, a speaker, etc. Communication interface 360 may include any transceiver-like mechanism that enables storage node 300.1 to communicate with other devices and/or systems, for example mechanisms for communicating with other storage nodes 300 or access nodes 120 such as for example two 1 gigabit (Gb) Ethernet interfaces.

Storage element interface 370 may comprise a storage interface such as for example a SATA interface or a small computer system interface (SCSI) for connecting bus 310 to one or more storage elements 380, such as one or more local disks, for example 3 terabyte (TB) SATA disk drives, and control the reading and writing of data to/from these storage elements 380. In one exemplary embodiment as shown in FIG. 2, such a storage node 300.1 could comprise ten or twelve 3 terabyte (TB) SATA disk drives as storage elements 380.1-380.10 and in this way storage node 300.1 would provide a storage capacity of 30 TB or 36 TB to the distributed storage system 100. According to the exemplary embodiment of FIG. 1 and in the event that storage nodes 300.2-300.40 (not shown) are identical to storage node 300.1 and each comprise a storage capacity of 36 TB, the distributed storage system 100 would then have a total storage capacity of 1440 TB.

As is clear from FIGS. 1 and 3 the distributed storage system 100 comprises a plurality of storage elements 380. As will be described in further detail below, the storage elements 380, could also be referred to as redundant storage elements 380 as the data is stored on these storage elements 380 such that none or a specific portion of the individual storage elements 380 on its own is necessary for the functioning of the distributed storage system. Each of the storage nodes 300 may comprise a share of these storage elements 380.

As shown in FIG. 1 storage node 300.1 comprises ten storage elements 380.1-380.10. Other storage nodes 300 could comprise a similar amount of storage elements 380, but this is, however, not essential. Storage node 300.2 (not shown) could, for example, comprise six storage elements 380.11-380.16 (not shown), and storage node 300.3 (not shown) could, for example, comprise four storage elements 380.17-380.20 (not shown). As will be explained in further detail below, the distributed storage system 100 may be operable as a distributed object storage system to store and retrieve a data object comprising data (e.g., 64 megabytes (MB) of binary data) and a data object identifier for addressing this data object, for example, a universally unique identifier such as a globally unique identifier (GUID). Embodiments of the distributed storage system 100 may operate as a distributed object storage system. Storing the data offered for storage by the application in the form of a data object, also referred to as object storage, may have specific advantages over other storage schemes such as suitable block-based storage or suitable file-based storage.

The storage elements 380 or a portion thereof may be redundant and operate independently of one another. This means that if one particular storage element 380 fails, its function can easily be taken on by another storage element 380 in the distributed storage system 100. However, as will be explained in more detail further below, the storage elements 380 are capable of providing redundancy without having to work in synchronism, as is for example the case in many redundant array of independent disks (RAID) configurations, which sometimes even require disk spindle rotation to be synchronized. Furthermore, the independent and redundant operation of the storage elements 380 may allow a suitable mix of types of storage elements 380 to be used in a particular distributed storage system 100. It is possible to use for example storage elements 380 with differing storage capacity, storage elements 380 of differing manufacturers, using different hardware technology such as for example suitable hard disks and solid-state storage elements, using different storage interfaces such as for example different revisions of SATA, parallel advanced technology attachment (PATA), and so on. This may result in advantages relating to scalability and flexibility of the distributed storage system 100 as it allows for adding or removing storage elements 380 without imposing specific requirements to their design in correlation to other storage elements 380 already in use in the distributed object storage system.

Figure 4:
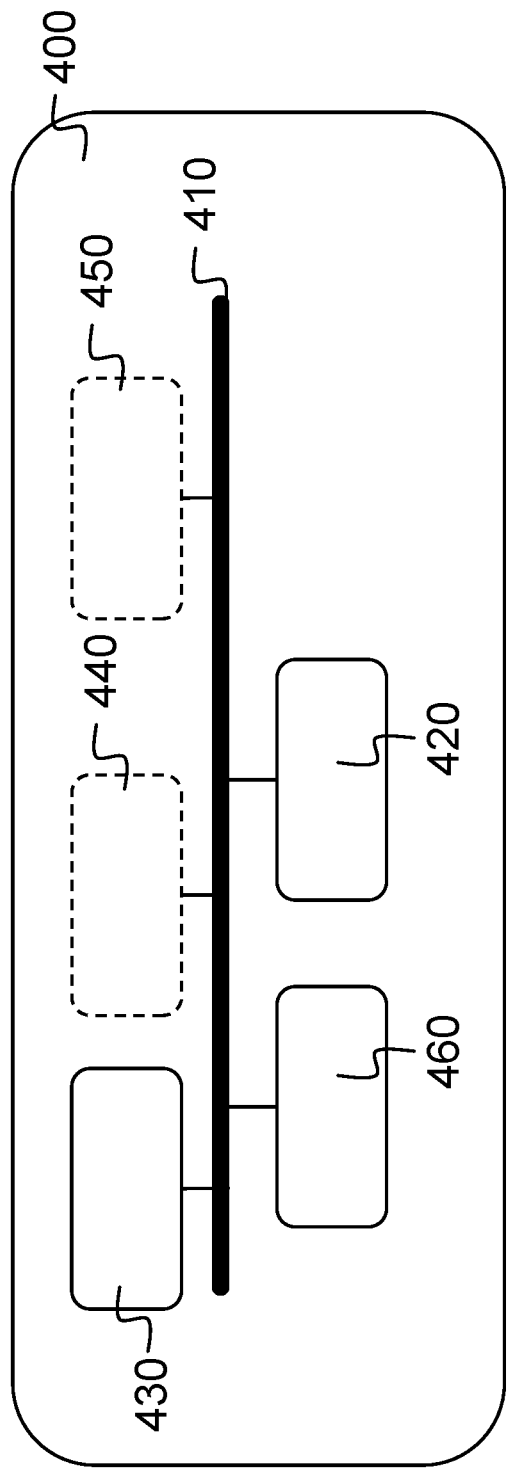
FIG. 4 schematically illustrates an example of a controller node or access node of the distributed storage system of FIG. 1.

FIG. 4 shows a schematic representation of an embodiment of the access node 400. Access node 400 may include controller node functions and/or file system interface functions for client systems using file system protocols to access data stored in data objects in storage nodes 300. Access node 400 may comprise a bus 410, a processor 420, a local memory 430, one or more optional input units 440, one or more optional output units 450. Bus 410 may include one or more conductors that permit communication among the components of controller or access node 400. Processor 420 may include any type of suitable processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disk or a solid-state storage element. An optional input unit 440 may include one or more suitable mechanisms that permit an operator to input information to the access node 400 such as a keyboard, a mouse, a pen, voice recognition and/or biometric mechanisms, etc. Optional output unit 450 may include one or more suitable mechanisms that output information to the operator, such as a display, a printer, a speaker, etc. Communication interface 460 may include any transceiver-like mechanism that enables access node 400 to communicate with other devices and/or systems, for example mechanisms for communicating with other storage nodes 300 or access nodes 400 such as for example two 10 Gb Ethernet interfaces.

According to an alternative embodiment, the access node 400 could have an identical design as a storage node 300, or according to still a further alternative embodiment one of the storage nodes 300 of the distributed object storage system could perform both the function of an access node 400 and a storage node 300. According to still further embodiments, the components of the access node 400 as described in more detail below could be distributed amongst a plurality of controller or access nodes 400 and/or storage nodes 300 in any suitable way. According to still a further embodiment, the clients 110 may run an access node 400. According to still further embodiments, access node 400 may be embodied in separate controller nodes and interface nodes with or without redundancy among the controller nodes and/or interface nodes.

Figure 5:
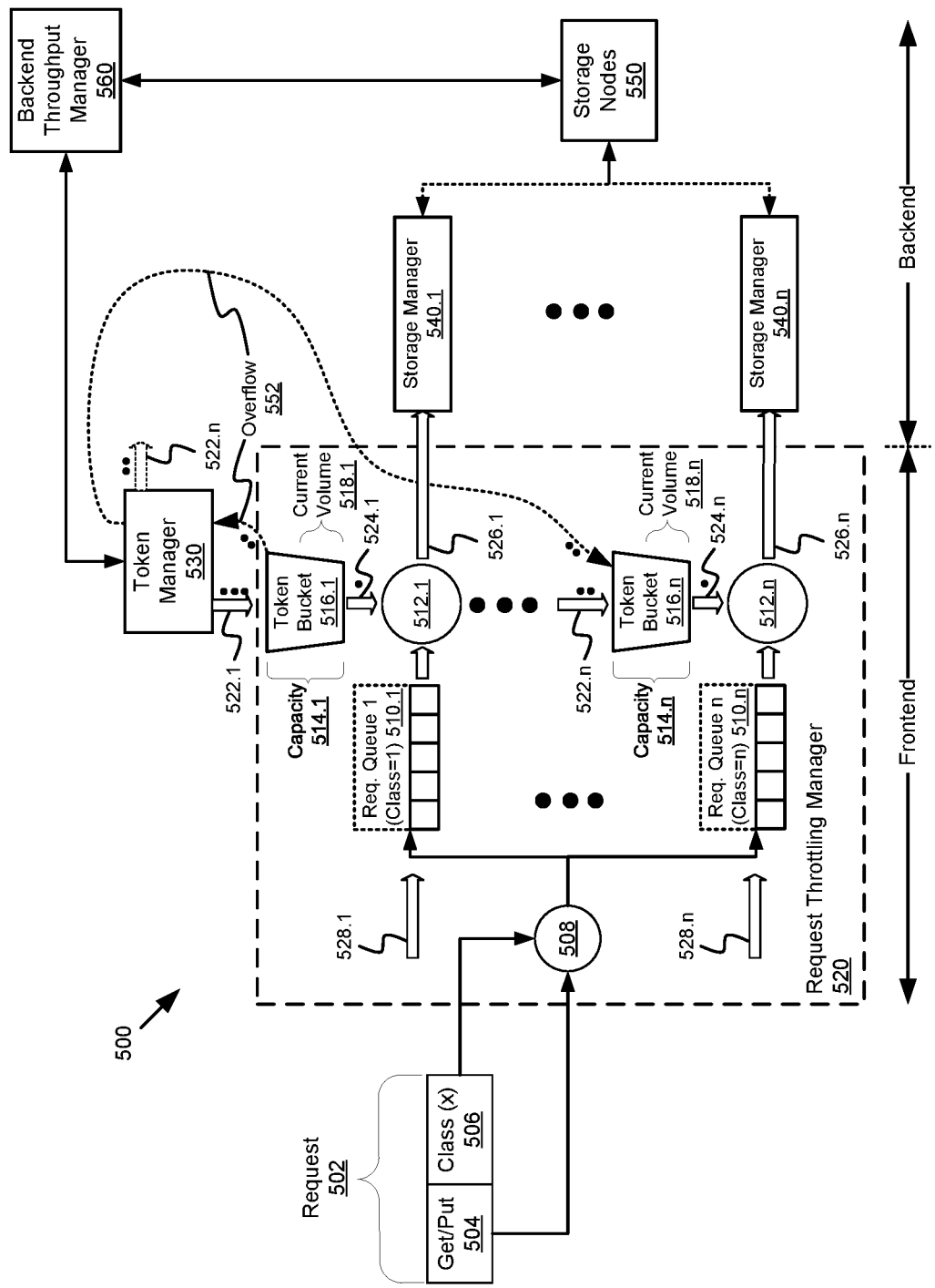
FIG. 5 illustrates a flow diagram of a distributed storage system configured with request throttling.

FIG. 5 illustrates a flow diagram of distributed storage system configured with request throttling, in accordance with various aspects. As stated, providing desired or promised QoS for large scale distributed storage systems (DSSs) guaranteeing for incoming requests is challenging. In the present aspects, improvements to QoS are provided by implementing throttling of file data requests to a distributed storage system.

In one embodiment, throttling of file data requests to a distributed storage system using a token bucket algorithm, ensures data transmission will conform to predefined limits for bandwidth and burstiness. To that end, a file data request handler 500 may be implemented within an access node 400 of a distributed storage system 100 as described herein.

Implementation of the disclosed throttling of the file data requests may include a request throttling manager 520 configured to receive a first file data request 502 from a client 110 or other host device that generates file data requests to a distributed storage system. Further, the source of the request does not necessarily need to be external to the system and may be generated internally as in the case of internal data maintenance or verification tasks such as a data repair task, data verification, or data rebalancing. In order to implement classes of requests 502, the request 502 includes a data operation 504, and a class identifier 506. The data operation 504 may include one of a GET operation corresponding to a storage read operation or a PUT operation corresponding to a storage write operation. Other operations are also contemplated such as operations to verify data or determine storage status. The class identifier 506 may include designators indicating priority classes, for example, certain classes of requests that should be handled out of order. Further, the class identifier need not be part of the request and may be determined by other means such as based on the source of the requests (e.g., IP, networks or the type of the requesting process), as well as using the type of request (e.g., read, write, delete, etc.).

The file data request 502 is provided to the request throttling manager 520 which includes a request class sorter 508 configured to receive the file data request 502. The request throttling manager 520 and the request class sorter 508 together form a means for receiving first and second file data requests. The request class sorter 508 using the class identifier 506, directs or places the data operation 504 of the filed data request 502 in a request queue 510 corresponding to the different class identifiers 506. The request queue(s) 510 form a mechanism for queueing the first and second file data requests. A request queue may have various configurations. For instance, a request queue may be configured as a first-in first-out (FIFO) queue or a priority queue, although other variations may apply.

In FIG. 5, the request throttling manager 520 is illustrated as including a first request queue 510.1 and additional request queues including at least a second request queue 510.n. The described file data request throttling may be configured to operate with one or more request queues 510. Further, while only two request queues 510 are illustrated, more than two distinct values of class identifiers 506 are also contemplated which result in more than two separate request queues 510. Further, the request queues 510 may be configured as first in first out (FIFO) queues, or alternatively may be configured as shift registers having other ordering combinations. Yet further, the request queues may be differently configured than FIFOs. For example, the request queues may be configured as priority queues that prioritize streams of related requests that are already in progress (e.g., previous requests that have already been granted tokens).

The request throttling manager 520 further includes a token bucket 516 configured to receive tokens, store tokens, and release tokens. The token buckets 516 may be configured to have a specific full capacity 514 and to exhibit a current volume 518 of tokens. Further, in order to process specific requests in the request queue 510, the token bucket 516 must include a sufficient quantity of tokens designated for the specific request.

The request throttling manager 520 further includes request gate 512 configured to conditionally pass the request data operation stored the request queue 510 to a storage manager 540 in the backend when a sufficient quantity of tokens is present. The request gate 512 and the token buckets 516 together form a means for processing the first and second file data requests in response to first and second token buckets respectively including sufficient first and second quantities of first and second tokens to process the first and second file data requests as first and second object data requests in a distributed storage system. The specific quantity of tokens required for the request is illustrated as token outflow 524 and reduces the current volume 518 of tokens by the respect quantity of tokens passing through the token outflow 524. By way of example, a single request may be debited one token for each byte in the request. In this way, the requests in the request queue may be processed at a guaranteed average rate of x bytes per second, while overload of the backend of the distributed storage system can be avoided.

In response to a sufficient quantity of tokens being present in the current volume 518 of token bucket 516 to process the specific request stored in the request queue 510, the request gate 512 allows the queued request data operation 504 to be passed over a request flow 526 to backend processing including to a storage manager 540. The storage manager 540 being configured to perform data processing including encoding, decoding, and interaction with storage nodes 550 as described above. In response to the token bucket 516 not including a sufficient quantity of tokens in the current volume 518 as required by the corresponding request operation in the request queue 510, the request operation remains in the request queue 510 and does not pass to the storage manager 540. Accordingly, inhibiting the passing of a request to the storage manager 540 provides a form of throttling of the requests and allows other request queues 510 that may be associated with a token bucket 516 that includes a sufficient quantity of tokens to forward their request to the storage manager 540 in a priority order.

The file data request handler 500 also includes a token manager 530 configured to manage tokens for each of the token buckets 516. As illustrated, the token buckets 516 also receive additional tokens over a token inflow 522. The additional tokens may be provided to the token buckets 516 according to various schedules and priorities. Specifically, token inflows 522 may occur over a periodic basis which allows the file data requests 502 to be throttled in the frontend to control the storage activity in the backend in the storage nodes 550. For example, the additional tokens provided through the token inflows 522 may include x tokens per chosen time interval and may be referred to at the rate of the token bucket. The time interval may be chosen based on the rate that the token bucket needs to react to changing conditions.

Alternatively, additional tokens may be provided to the token buckets based on a class associated with each bucket. For example, classes that have higher priority may be stored in request queues that include filed data requests that should be processed ahead of other requests in other request queues. In order to accommodate the different priorities of the different classes, the token manager 530 may provide more tokens to the token bucket 516 through the token inflow 522. Accordingly, file data request throttling is accomplished by the token manager 530 regulating the quantity of tokens dispensed to each of the token buckets 516.

As illustrated in FIG. 5, the file data request throttling may occur using a single or first throttling path 528.1 including single or first request queue 510.1, a single or first token bucket 516.1, and a single or first request gate 512.1. When using a single throttling path 528.1 the flow of all file data requests 502 may be throttled to provide a specific QoS level. Additionally or Alternatively, when multiple classes of service are provided and managed, additional or at least a second throttling path 528.n including an additional or at least a second request queue 510.n, an additional or at least a second token bucket 516.n, and an additional or at least a second request gate 512.n, etc., may be included. When using multiple throttling paths 528, the flow of all file data requests 502 may be throttled based on class identifiers 506 to provide a specific QoS level for each class. Accordingly, the request throttling manager 520 may be configured to include two or more token buckets, for example, where each may be associated with a particular type of request, and/or associated with a particular class (e.g., priority level) for a request. Higher classes or priorities of requests may then be guaranteed other QoS levels than lower class or priority requests.

For example, requests involving retrieval of data might be given higher priority than requests involving storage of data. Requests from background/maintenance processes could, for example, be associated with a lower priority than frontend client requests. Each of the plurality of token buckets in such an aspect will be provided with a share of the total throughput. When, for example, two token buckets are available for handling requests with a total throughput of 1 gigabyte (GB) per second, then for example by means of weights this total throughput is assigned to the two token buckets such that: (a) the first token bucket for example receives 30% of the total throughput, and thus allows for a throughput of 300 MB/s for the associated requests, and (b) the second token bucket for example receives 70% of the total throughput, and thus allows for 700 MB/s for the associated requests. Therefore, the throughput is realized by setting the rate at which tokens are added to the token buckets. Accordingly, requests of the type associated with the first token bucket will be processed when tokens are available in the first token bucket and requests of the type associated with the second token bucket will be processed when tokens are available in the second token bucket.

In other aspects, the file data request handler 500 further includes the ability to identify and reuse unused capacity in the distributed storage system. Generally, when a specific throttling path is underutilized, the token bucket 516 will accumulate tokens at a rate greater than the outflow. Specifically, when the token inflow 522 is greater than the token outflow 524 of the token bucket, then the token bucket will overflow with tokens. The overflow of tokens represents unused capacity in the distributed storage system. The overflowing tokens may be discarded resulting in the unused capacity being ignored. In the alternative, the overflowing tokens, as determined by the token manager 530, may be reassigned as represented by the overflow path 552 to other token buckets. In the example illustrated in FIG. 5, the token bucket 516.1 is illustrated, by the token overflow path 552, as having excess tokens. Accordingly, the token manager 530 moves or reassigns the overflowing tokens from token bucket 516.1 to token bucket 516.n. By providing additional tokens to the token bucket 516.n, the second throttling path 528.n is capable of processing more requests from the request queue 510.n.

In other aspects, when a second token bucket is associated with a higher priority class than a first token bucket, the overflow of tokens could be provided to a depleted second token bucket. The additional tokens in the second token bucket could cause the second token bucket to be filled to capacity, with any other remaining overflow tokens being distributed over yet other token buckets.

In yet another aspect, the overflow tokens may be distributed to other token buckets based on weights associated with the classes of the token buckets. To avoid a circular overflow loop where overflow tokens are added to full token buckets which in turn creates another overflow event, a rule could be applied to buckets where the current volume is equal to the capacity (e.g., a full token bucket) are ineligible to receive overflow tokens. If all buckets are full, and there are still overflow tokens to be distributed, then the remaining overflow tokens are discarded.

In other aspects, the token manager 530 may adjust the quantity of token distributed to the one or more token buckets 516 based on a backend throughput. Accordingly, the file data request handler 500 may include a backend throughput manager 560 configured to determine or estimate the backend throughput associated with one or more of the storage managers 540 and the storage nodes 550 of the distributed storage system. The backend throughput manager 560 forms a feedback loop between the backend storage processing including the storage manager(s) 540 and the storage nodes 550, and the frontend of the distributed storage system including the request throttling manager 520 and the token manager 530.

Since a large-scale distributed storage system is generally not a static system, the available capacity for handling requests changes over time. Therefore, the throughput of the distributed storage system changes with time, traffic, resources. Accordingly, the capacity 514 of the token buckets 516, and/or the rate of the token inflow 522 may be adapted as a function of the determined or estimated throughput as identified by the backend throughput manager 560. Identification of a current throughput may improve the utilization of resources resulting in a cost savings to a user. Based on this information the total available capacity or throughput is determined or estimated, and the capacity 514 and/or token inflow 522 may be adjusted in response to the determinations of the backend throughput manager 560.

Precise determination of throughput in a distributed storage system is challenging due to differences in data object sizes and distribution of encoded objects across storage nodes that may be spatially diverse. Accordingly, the throughput is highly dependent on the size of the data objects being stored. Usually, larger objects are stored at a higher throughput, than a large number of small data objects as this results in a higher number of input output operations (TOPS). Therefore, making use of the predefined parameters for the read and write throughput of the storage elements being used in the nodes of a large-scale distributed storage system is possible, but not optimal.

In one aspect, a throughput parameter is identified which is not object-size dependent, but allows the backend storage nodes/elements to be used at their full capacity. The backend throughput parameter may be determined as follows:

a) retrieve the throughput of each storage node/element (this may be, for example, exposed by the kernel of the storage node comprising these storage elements);

b) retrieve the utilization which is equal to 1—idle time of each storage element. This may, for example, be expressed as a percentage of a time period that the storage node/element is in operation, where 100% means that the storage element is fully loaded, and where 1% means that the storage element is almost not loaded. The utilization rate is a value between 0 and 1, corresponding to the range 0% to 100%;

c) for each storage element, the throughput is divided by the utilization rate, which provides an estimated preferred throughput per storage element;

d) sum these storage node/element preferred throughputs to get the backend preferred throughput; and e) this backend preferred throughput sometimes must be adjusted by a suitable factor to account for specific storage and retrieval methods being used by the DSS, such as, for example, erasure encoding, etc. This factor could be different for read and write operations.

The resulting value may optionally be further adjusted with a load factor (e.g., 0.95). For example, a system running at 100% of total capacity is more prone to overload, while a system running at 95% capacity sacrifices some of that capacity for added stability. Choosing this load factor is thus a balancing act between throughput and performance stability (e.g., a lower factor means more stable performance; a higher factor means more throughput).

When measuring the backend throughput parameters of the distributed storage system at regular intervals (e.g., every 15 seconds or faster), and making use of this backend throughput parameter in the feedback loop to adjust the rate of token inflow 522 and/or capacity 514 of the token buckets 516 makes it possible to (a) throttle the throughput of each of the type of requests associated with the buckets without the risk of increasing latency; and (b) utilize the currently available capability of the storage nodes/elements of the backend maximally.

Figure 6:
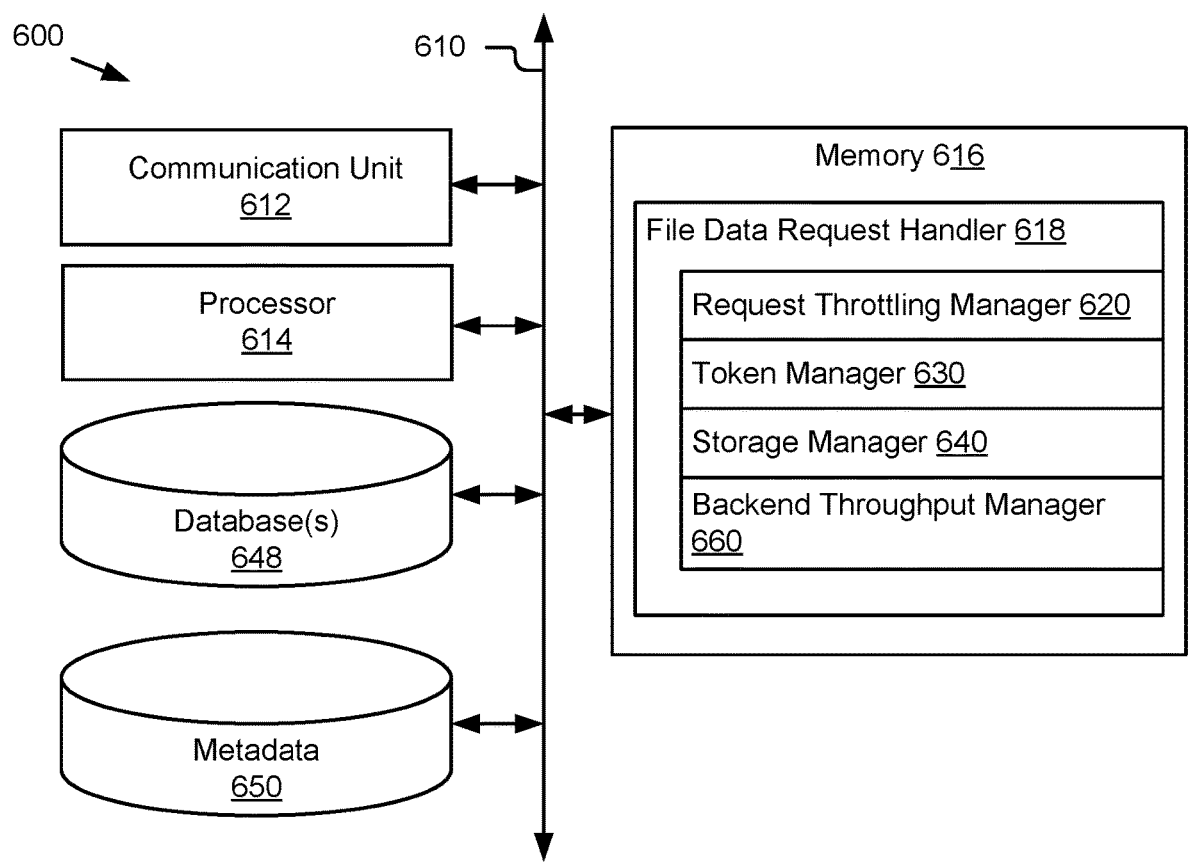
FIG. 6 schematically shows selected modules of an access node or controller node with file data request throttling functions.

FIG. 6 schematically shows selected modules of an access node or controller node with file data request throttling functions. System node 600 may be configured as a node with an architecture and/or hardware similar to controller nodes and/or storage nodes. System node 600 may incorporate elements and configurations similar to those shown in FIGS. 1-5. For example, system node 600 may show selected modules of access node 20 related to handling file data requests.

System node 600 may include a bus 610 interconnecting at least one communication unit 612, at least one processor 614, and at least one memory 616. Bus 610 may include one or more conductors that permit communication among the components of system node 600. Communication unit 612 may include any transceiver-like mechanism that enables system node 600 to communicate with other devices and/or systems. For example, communication unit 612 may include wired or wireless mechanisms for communicating with file system clients, other access systems, and/or one or more object storage systems or components, such as storage nodes or controller nodes. Processor 614 may include any type of processor or microprocessor that interprets and executes instructions. Memory 616 may include a random access memory (RAM) or another type of dynamic storage device that stores information and instructions for execution by processor 614 and/or a read only memory (ROM) or another type of static storage device that stores static information and instructions for use by processor 614 and/or any suitable storage element such as a hard disk or a solid-state storage element.

System node 600 may include or have access to one or more databases 648 and specialized data stores, such as metadata store 650. Databases 648 may include one or more data structures for storing, retrieving, indexing, searching, filtering, etc. of structured and/or unstructured data elements. Metadata store 650, and/or other databases 648 may be maintained and managed in separate computing systems with separate communication, processor, memory, and other computing resources and accessed by system node 600 through database access protocols, such as structured query language (SQL). Metadata store 650 may be structured as key-value stores and may be shared across multiple system nodes 600.

System node 600 may include a plurality of modules or subsystems that are stored and/or instantiated in memory 616 for execution by processor 614. For example, memory 616 may include a file data request handler 618 configured to receive, process, and respond to file data requests, and to throttle file data requests from file system clients. File data request handler 618 may be configured to receive file data requests and process the received file data requests to generate one or more storage data requests for processing by an associated distributed storage system, such as object data requests for an object storage system. File data request handler 618 may communicate with metadata store 650 to store and retrieve data element cross-reference metadata to map the file system files of the requesting client to the storage data elements and/or locations of the distributed storage system.

File data request handler 618 may include a request throttling manager 620, a token manager 630, a storage manager 640, and a backend throughput manager 660. File data request handler 618 may include additional modules (not shown) for other data access features, such as data caching, request prioritization, etc.

Request throttling manager 620 may include an interface and/or communication event-based condition for receiving file data requests from one or more file system clients. For example, client systems may send a file data request over a network connection and addressed to system node 600 or a port or component thereof. Request throttling manager 620 may receive these requests and parse them into one or more respective request queues. The request throttling manager 620 may include a first token bucket and may be configured to receive a first file data request, queue the first file data request in a first request queue, and process the first file data request in response to the first token bucket including a sufficient first quantity of first tokens to process the first file data request. Further, the first token bucket may be configured with a first token bucket capacity, where the first token bucket capacity defines a maximum number of tokens that may be stored in the first token bucket.

In other aspects, the request throttling manager 620 may include a second token bucket and may be configured to receive a second file data request, queue the second file data request in a second request queue, and process the second file data request in response to a second token bucket including a sufficient second quantity of second tokens to process the second file data request. Further, the first file data request may include a first class identifying a first priority of the first file data request.

In yet other aspects, the first and second token buckets may be configured with respective first and second token bucket capacities, where the token bucket capacities define a maximum number of tokens that may be stored in the respective first and second token buckets.

The token manager 630 may include an interface for coupling with the request throttling manager 620 and other modules, such as a backend throughput manager 660. The token manager 630 may be configured such that in response to the first quantity of first tokens in the first token bucket exceeding the first token bucket capacity by a first difference of the first tokens, the first difference of the first tokens is then distributed as a first overflow of first tokens to the second token bucket.

The storage manager 640 may include an interface for coupling with the request throttling manager 620 and the storage nodes. The storage manager 640 may be configured to access storage nodes of a distributed storage system in response to the first file data request. The storage manager 640 is further configured to access storage nodes of the distributed storage system in response to the second file data request.

The backend throughput manager 660 may include an interface for coupling with the token manager 630 and the storage nodes. The backend throughput manager 660 may be configured to vary the first token bucket capacity based on a throughput of the distributed storage system. The throughput may be defined by a throughput parameter that is independent of the sizes of the object requests made to/received and/or processed by the distributed storage system. Further, the backend throughput manager 660 may be further configured to determine the throughput parameter by retrieving the throughput of each storage node in the distributed storage system; retrieving a utilization rate of each storage node; for each of the storage node in the distributed storage system, generating an estimated preferred throughput per storage node by dividing the throughput by the utilization rate; summing throughputs of each of the storage nodes into a backend throughput; adjusting the backend throughput with a factor to account for specific storage and retrieval methods used by the distributed storage system; and adjusting the backend throughput based on a desired load factor of the distributed storage system. In a non-limiting example, the utilization rate may be defined as one minus idle time of each storage node in the distributed storage system, although other suitable rates are applicable and may be used.

Figure 7:
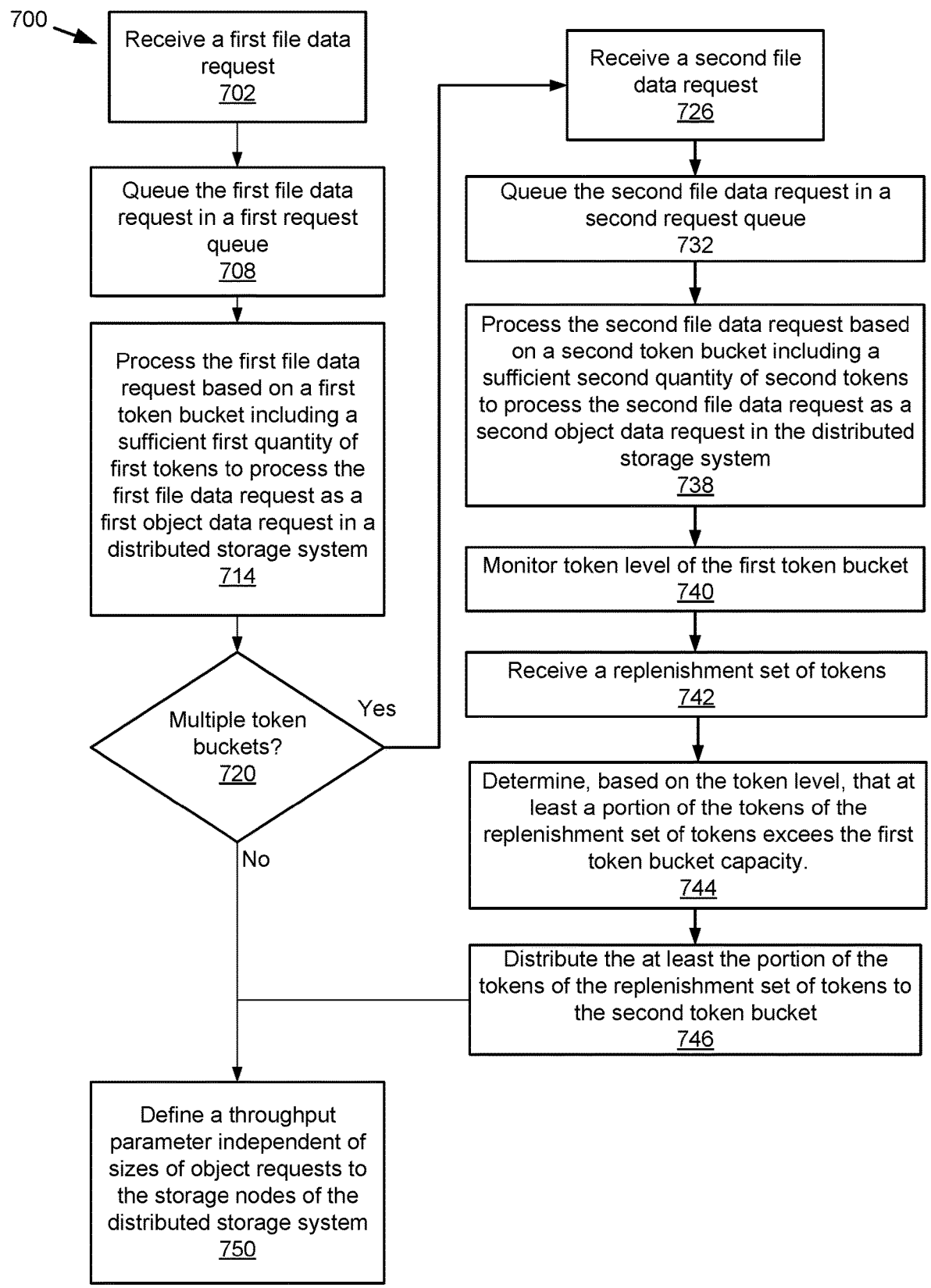
FIG. 7 illustrates a method for providing a QoS for incoming requests in a distributed storage system.

FIG. 7 illustrates a method for providing a QoS for incoming requests in a distributed storage system. In the disclosed method 700, a token bucket is used to provide control of burstiness and bandwidth of requests presented to a distributed storage system.

At a block 702, a request throttling manager receives a first file data request. In one embodiment, the first file data request includes a first class identifying a first priority of the first file data request.

At a block 708, the request throttling manager queues the first file data request in a first request queue.

At a block 714, a storage manager processes the first file data request in response to a first token bucket including a sufficient first quantity of first tokens to process the first file data request as a first object data request in a distributed storage system. The first token bucket is configured with a first token bucket capacity, where the first token bucket capacity defines a maximum number of tokens that may be stored in the first token bucket, and where the method further comprises varying the first token bucket capacity based on a throughput of the distributed storage system.

At a block 720, a determination is made to decide if two or more token buckets, such as a first and second token buckets, are utilized to support multiple classes of requests.

When a plurality of token buckets are used, then at a block 726 a request throttling manager receives a second file data request. In one embodiment, the second file data request includes a second class identifying a second priority of the second file data request.

At a block 732, the request throttling manager queues the second file data request in a second request queue.

At a block 738, a storage manager processes the second file data request in response to a second token bucket including a sufficient second quantity of second tokens to process the second file data request as a second object data request in the distributed storage system. The second token bucket is configured with a second token bucket capacity, where the second token bucket capacity defines a maximum number of tokens that may be stored in the second token bucket, and where the method further comprises varying the second token bucket capacity based on a throughput of the distributed storage system.

At a block 740, a token level of the first token bucket is monitored by the system and/or components thereof. At a block 742, the first token bucket receives a replenishment set of tokens. At a block 744, a determination based on the token level is made that at least a portion of the tokens of the replenishment set of tokens exceeds the first token bucket capacity. In a block 746, at least a portion of the tokens of the replenishment set of tokens are distributed to the second token bucket.

At a block 750, a backend throughput manager may define a throughput parameter independent of sizes of object requests to the storage nodes of the distributed storage system. The throughput parameter may be determined by retrieving the throughput of each storage node (also called storage node throughput) of a set of storage nodes in the distributed storage system. As discussed elsewhere herein, the distributed storage system may include any suitable number of storage nodes (e.g., a plurality of storage nodes). The set of storage nodes make include some or all of the storage nodes (e.g., two or more, substantially all, a given type of storage node, etc.). The backend throughput manager may retrieve a utilization rate of each storage node of the set. The utilization rate may, in some cases for example, be defined as one minus the idle time of each storage node in the distributed storage system, although other formulas may apply. The backend throughput manager may, for each of the storage node of the set, generate an estimated preferred throughput per storage node by dividing the throughput by the utilization rate; sum throughputs of each of the storage nodes of the set into a backend throughput; adjust the backend throughput with a factor to account for specific storage and retrieval methods used by the distributed storage system; and adjust the backend throughput based on a desired load factor of the distributed storage system. In some cases, the backend throughput manager may calculate the backend through put based on the storage node throughputs as discussed elsewhere herein.

Further, while (i) the blocks 702, 708, 714, 726, 732, and 738 illustrating first and second request control flows, (ii) the blocks 740, 742, 744, and 746 illustrating token replenishment flows, and (iii) the block 750 illustrating the throughput flow) in FIG. 7 are illustrated as being interleaved control flows, the respective groups of blocks may also be configured as individual distinct control flows.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

It should be understood that various aspects of the present technology may be embodied as a system, method, or computer program product. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute on a user's computing device, partly on a user's computing device, as a stand-alone software package, partly on a user's computing device and partly on a remote computing device, or on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, are implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, are implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
  a request throttling manager including a plurality of throttling paths, wherein:
    each throttling path of the plurality of throttling paths corresponds to a priority class of file data requests and comprises:
      a request queue configured to queue file data requests of that priority class;
      a token bucket allocated tokens for processing file data requests of that priority class; and
      a request gate configured to selectively pass, based on a quantity of tokens in the token bucket, file data requests to a corresponding storage manager for that priority class for processing; and
    the request throttling manager is configured to:
      receive a plurality of file data requests;
      determine, based on priority classes of the plurality of file data requests, corresponding throttling paths from the plurality of throttling paths;
      queue the plurality of file data requests in corresponding request queues of the corresponding throttling paths; and
      pass, responsive to the token bucket of any throttling path including a sufficient quantity of tokens to process a next file data request of that priority class, the next file data request from that request queue through the request gate of that throttling path to the corresponding storage manager for that priority class;

a token manager configured to allocate a number of tokens to each token bucket based on an allocation of throughput to each throttling path of the plurality of throttling paths; and a plurality of storage managers configured to access one or more storage nodes of a plurality of storage nodes of a distributed storage system, wherein:

each storage manager is configured to receive data requests from a corresponding throttling path in response to the file data requests passed by that throttling path; and simultaneous processing of storage requests of different priority classes from different throttling paths by the plurality of storage managers allocates a total throughput of the plurality of storage nodes of the distributed storage system.

2. The system of claim 1, wherein:

the plurality of file data requests includes a first file data request; and the request throttling manager is further configured to:

determine, based on a first priority class of the first file data request, a first throttling path from the plurality of throttling paths;

queue the first file data request in a first request queue of the first throttling path; and pass, responsive to a first token bucket of the first throttling path including a sufficient first quantity of first tokens to process the first file data request, the first file data request from the first request queue through a first request gate of the first throttling path to the corresponding storage manager.

3. The system of claim 2, wherein:

the plurality of file data requests includes a second file data request; and the request throttling manager is further configured to:

determine, based on a second priority class of the second file data request, a second throttling path from the plurality of throttling paths;

queue the second file data request in a second request queue of the second throttling path; and pass, responsive to a second token bucket of the second throttling path including a sufficient second quantity of second tokens to process the second file data request, the second file data request from the second request queue through a second request gate of the second throttling path to the corresponding storage manager.

4. The system of claim 3, wherein:

the first token bucket and the second token bucket are respectively configured with a first token bucket capacity and a second token bucket capacity;

the first token bucket capacity defines a maximum number of tokens that may be stored in the first token bucket; and the second token bucket capacity defines a maximum number of tokens that may be stored in the second token bucket.

5. The system of claim 4, wherein the token manager is further configured to:

monitor a token level of the first token bucket;

receive a replenishment set of tokens;

determine, based on the token level, that at least a portion of the tokens of the replenishment set of tokens exceeds the first token bucket capacity; and distribute the at least the portion of the tokens of the replenishment set of tokens to the second token bucket.

6. The system of claim 3, wherein the first request queue and the first token bucket operate independently of the second request queue and the second token bucket.

7. The system of claim 2, further comprising a backend throughput manager, wherein:

the first token bucket is configured with a first token bucket capacity;

the first token bucket capacity defines a maximum number of tokens that may be stored in the first token bucket; and the backend throughput manager is configured to vary the first token bucket capacity based on a throughput of the distributed storage system.

8. The system of claim 7, wherein the throughput is defined by a throughput parameter that is independent of sizes of object requests received by the distributed storage system.

9. The system of claim 8, wherein the backend throughput manager is further configured to determine the throughput parameter by:

determining a storage node throughput of each storage node of a set of storage nodes in the distributed storage system, the set of storage nodes including two or more storage nodes of the plurality of storage nodes of the distributed storage system;

determining a utilization rate of each storage node of the set of storage nodes, wherein the utilization rate is based on an idle time of each storage node of the set of storage nodes in the distributed storage system;

for each storage node of the set of storage nodes in the distributed storage system, generating an estimated preferred throughput per storage node based on the utilization rate;

calculating a backend throughput based on the storage node throughput of each storage node of the set of storage nodes;

adjusting the backend throughput based on one or more of a specific storage method and a specific retrieval method used by the distributed storage system; and adjusting the backend throughput based on a desired load factor of the distributed storage system.

10. The system of claim 2, wherein the first request queue is configured as one of a first-in first-out (FIFO) queue and a priority queue.

11. The system of claim 2, wherein the first file data request further includes a class identifier that identifies a handling priority of the first file data request in the first request queue.

12. A computer-implemented method, comprising:

receiving, by an access node for a distributed storage system, a plurality of file data requests, wherein:

the access node includes a plurality of throttling paths;

each throttling path of the plurality of throttling paths corresponds to a different priority class of file data requests; and each throttling path of the plurality of throttling paths comprises:

a request queue configured to queue file data requests of that priority class;

a token bucket allocated tokens for processing file data requests of that priority class; and a request gate configured to selectively pass, based on a quantity of tokens in the token bucket, file data requests to a corresponding storage manager for that priority class for processing;

allocating a number of tokens to each token bucket based on an allocation of throughput to each throttling path of the plurality of throttling paths;

determining, based on priority classes of the plurality of file data requests, corresponding throttling paths from the plurality of throttling paths;

queueing the plurality of file data requests in corresponding request queues of the corresponding throttling paths;

passing, responsive to the token bucket of any throttling path including a sufficient quantity of tokens to process a next file data request as a next object data request, the next object data request from that request queue through the request gate of that throttling path to the corresponding storage manager for that priority class in the distributed storage system;

receiving, by the corresponding storage manager of a plurality of storage managers, data requests from a corresponding throttling path for that priority class in response to the file data requests passed by that throttling path; and simultaneously processing, by the plurality of storage managers, storage requests of different priority classes from different throttling paths to allocate a total throughput of a plurality of storage nodes of the distributed storage system.

13. The computer-implemented method of claim 12, wherein the plurality of file data requests includes a file data request, the method further comprising:

determining, based on a first priority class of the file data request, a first throttling path from the plurality of throttling paths;

queueing the file data request in a first request queue of the first throttling path; and passing, responsive to a first token bucket of the first throttling path including a sufficient quantity of first tokens to process the first file data request as a first object data request, the first object data request from the first request queue through a first request gate of the first throttling path to a first storage manager for the first priority class in the distributed storage system.

14. The computer-implemented method of claim 13, wherein the plurality of file data requests includes a second file data request, the method further comprising:

determining, based on a second priority class of the second file data request, a second throttling path from the plurality of throttling paths;

queueing the second file data request in a second request queue of the second throttling path; and passing, responsive to a second token bucket of the second throttling path including a sufficient second quantity of second tokens to process the second file data request as a second object data request, the second object data request from the second request queue through a second request gate of the second throttling path to a second storage manager for the second priority class in the distributed storage system.

15. The computer-implemented method of claim 14, wherein:

the first token bucket and the second token bucket are respectively configured with a first token bucket capacity and a second token bucket capacity;

the first token bucket capacity defines a maximum number of tokens that may be stored in the first token bucket; and the second token bucket capacity defines a maximum number of tokens that may be stored in the second token bucket.

16. The computer-implemented method of claim 15, further comprising:

monitoring a token level of the first token bucket;

receiving a replenishment set of tokens;

determining, based on the token level, that at least a portion of the tokens of the replenishment set of tokens exceeds the first token bucket capacity; and distributing the at least the portion of the tokens of the replenishment set of tokens to the second token bucket.

17. The computer-implemented method of claim 13, wherein:

the first token bucket is configured with a first token bucket capacity;

the first token bucket capacity defines a maximum number of tokens that may be stored in the first token bucket; and the method further comprises varying the first token bucket capacity based on a throughput of the distributed storage system.

18. The computer-implemented method of claim 17, wherein the throughput is defined by a throughput parameter that is independent of sizes of object requests received by the distributed storage system.

19. The computer-implemented method of claim 18, further comprising determining the throughput parameter by:

determining a storage node throughput of each storage node of a set of storage nodes in the distributed storage system;

determining a utilization rate of each storage node of the set of storage nodes, wherein the utilization rate is based on an idle time of each storage node of the set of storage nodes in the distributed storage system;

for each storage node of the set of storage nodes in the distributed storage system, generating an estimated preferred throughput per storage node based on the utilization rate;

calculating a backend throughput based on the storage node throughput of each storage node of the set of storage nodes;

adjusting the backend throughput based on one or more of a specific storage method and a specific retrieval method used by the distributed storage system; and adjusting the backend throughput based on a desired load factor of the distributed storage system.

20. A system, comprising:

an access node including a plurality of throttling paths, wherein each throttling path of the plurality of throttling paths corresponds to a priority class of file data requests and comprises:

a request queue configured to queue file data requests of that priority class;

a token bucket allocated tokens for processing file data requests of that priority class; and a request gate configured to selectively pass, based on a quantity of tokens in the token bucket, file data requests to a corresponding storage manager for that priority class for processing;

means for receiving a plurality of file data requests;

means for allocating a number of tokens to each token bucket based on an allocation of throughput to each throttling path of the plurality of throttling paths;

means for determining, based on priority classes of the plurality of file data requests, corresponding throttling paths from the plurality of throttling paths;

means for queueing the plurality of file data requests in corresponding request queues of the corresponding throttling paths;

means for passing, responsive to the token bucket of any throttling path including a sufficient quantity of tokens to process a next file data request as a next object data request, the next object data request from that request queue through the request gate of that throttling path to the corresponding storage manager for that priority class in a distributed storage system;

means for receiving, by the corresponding storage manager of a plurality of storage managers, data requests from a corresponding throttling path for that priority class in response to the file data requests passed by that throttling path; and means for simultaneously processing, by the plurality of storage managers, storage requests of different priority classes from different throttling paths to allocate a total throughput of a plurality of storage nodes of the distributed storage system.

* * * * *